United States Patent [15] 3,687,997
Kiehs et al. [45] Aug. 29, 1972

[54] ETHYL N-CYCLOHEXYL N-PROPARGYL-THIOLCARBAMATE AS A HERBICIDE

[72] Inventors: Karl Kiehs, 4 Sudermannstrasse, 6700 Ludwigshafen; Karl-Heinz Koenig, 8a Pierstrasse, 6710 Frankenthal; Adolf Fischer, 43 Speyererstrasse, 6704 Mutterstadt, all of Germany

[22] Filed: March 27, 1969

[21] Appl. No.: 811,226

[52] U.S. Cl. ........... 260/455 A, 260/454, 71/100
[51] Int. Cl. ........................................... C07c 155/08
[58] Field of Search ............. 260/455 A; 71/100

[56] References Cited

UNITED STATES PATENTS

| | | | |
|---|---|---|---|
| 2,901,499 | 8/1959 | Tilles et al. | 71/100 |
| 3,151,119 | 9/1964 | Grisley et al. | 260/455 |
| 3,175,897 | 3/1965 | Tilles et al. | 71/100 |
| 3,235,368 | 2/1966 | Surgant | 260/455 |
| 3,298,817 | 1/1967 | Tilles | 260/455 |
| 3,305,576 | 2/1967 | D'Amico et al. | 71/100 |
| 3,268,524 | 8/1966 | Moore | 260/563 |

OTHER PUBLICATIONS

Tilles, II " Thiolcarbamates, Prep. & Mol. Refractions," (1959) CA 53, pp. 16,955– 16,960 (1959)

Primary Examiner—Lewis Gotts
Assistant Examiner—G. Hollrah
Attorney—Johnston, Root, O'Keeffe, Keil, Thompson & Shurtleff

[57] ABSTRACT

New and valuable substituted thiolcarbamates having the formula

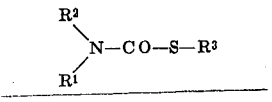

in which $R^1$ denotes a propargyl, cyanomethyl, β-cyanoethyl or β-chloro-β-cyanoethyl radical and $R^2$ has the same meanings as $R^1$, $R^1$ and $R^2$ being identical or different, and $R^2$ may also denote a phenyl or cyclohexyl radical or an aliphatic radical having not more than six carbon atoms which may bear hydroxyl, chloro or thiocyano, lower alkoxythioether or lower alkylthioether groups as substituents and $R^3$ denotes an aliphatic radical which may be substituted by halogen atoms. These compounds are effective herbicidal active ingredients which are particularly suitable for controlling unwanted grassy plants while leaving crop plants undamaged.

1 Claim, No Drawings

ETHYL N-CYCLOHEXYL N-PROPARGYL-THIOLCARBAMATE AS A HERBICIDE

The present invention relates to substituted thiolcarbamates and herbicides containing them.

It is known to use n-propyl-N-ethyl-N-butylthiolcarbamate and ethyl-N-ethyl-N-cyclohexylthiolcarbamate as herbicides (U.S. Pat. No. 3,175,897); their action is, however, not satisfactory.

An object of the invention is new and valuable substituted thiolcarbamates. A further object of the invention is a process for controlling unwanted plants with new and valuable substituted thiolcarbamates. Yet another object of the invention is the control of unwanted plants without damaging crop plants. These and other objects of the invention are achieved by substituted thiolcarbamates having the formula

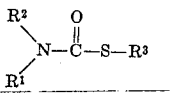

in which $R^1$ denotes a propargyl, cyanomethyl, $\beta$-cyanoethyl or $\beta$-chloro-$\beta$-cyanoethyl radical and $R^2$ has the same meanings as $R^1$, $R^1$ and $R^2$ being identical or different, and $R^2$ may also denote a phenyl or cyclohexyl radical or an aliphatic radical having not more than six carbon atoms (methyl, ethyl, propyl, isopropyl, butyl, isobutyl, sec-butyl, tert-butyl, n-hexyl, n-pentyl, allyl, methallyl, isobutynyl, 3-methylbutyn(1)yl-(3)) which may bear hydroxyl, chloro or thiocyano, lower alkoxy (methoxy, ethoxy, propoxy) or alkyl (methyl, ethyl, propyl, isopropyl, butyl, isobutyl) thioether groups as substituents, and $R^3$ denotes an aliphatic (methyl, ethyl, propyl, isopropyl, butyl, isobutyl, sec-butyl, tert-butyl, allyl, methallyl, isobutynyl, 3-methylbutyn-(1)yl(3)) radical which may be substituted by one or more than one halogen atom (chlorine, bromine).

The new active ingredients may be prepared by reacting N,N-disubstituted carbamic acid chlorides with mercaptans in the presence of acid-binding agents or with the alkali metal or alkaline earth metal salts of mercaptans or by reacting compounds having the formula

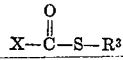

in which X denotes halogen and $R^3$ has the meanings given above with the corresponding amines.

EXAMPLE 1

Preparation of N-propyl-N-propyl-N-$\beta$-cyanoethylthiolcarbamate

Five and six tenths part (by weight) of n-propyl-$\beta$-cyanoethylamine and 5.0 parts of triethyl-amine are dissolved in 50 parts of toluene. 7.2 parts of thio-n-propyl chloroformate is dripped in over a period of 15 minutes at 0° to +5° C and the whole subsequently stirred at room temperature for a further two hours. Then the toluene solution is washed first with water and then with a 5 percent aqueous sodium bicarbonate solution. After drying over sodium sulfate the toluene is distilled off under a water jet vacuum and at a temperature of 50° C. As residue, 10.3 parts of the product is obtained as a water oil; $n_D^{25} = 1.4912$.

EXAMPLE 2

Preparation of ethyl-N-cyclohexyl-N-propargylthiolcarbamate

Eighteen parts by weight of thioethyl chloroformate is dripped, at 70° to 80° C, into a mixture of 15 parts by weight of triethylamine, 20 parts by weight of N-cyclohexyl-N-propargylamine and 120 parts by weight of benzene. The mixture is boiled under reflux for two hours and then decomposed with water. The solution is then washed with dilute sulfuric acid, dried and distilled. The end product is obtained in this manner in a yield of 85 percent of the theory; boiling point at 0.01 mm = 117° to 119° C.

Examples of active ingredients prepared in this way are as follows:

| | $n_D^{25}$ |
|---|---|
| n-propyl-N-methyl-N-$\beta$-cyanoethylthiolcarbamate | 1.4995 |
| n-propyl-N-propyl-N-cyanomethylthiolcarbamate | 1.4909 |
| n-propyl-N-propyl-N-($\beta$-chloro-$\beta$-cyanoethyl)-thiolcarbamate | 1.4962 |
| n-propyl-N-isopropyl-N-$\beta$-cyanoethylthiolcarbamate | 1.4937 |
| n-propyl-N-butyl-N-$\beta$-cyanoethylthiolcarbamate | 1.4891 |
| n-propyl-N-butyl-N-cyanomethylthiolcarbamate | 1.4888 |
| n-propyl-N-n-hexyl-N-$\beta$-cyanoethylthiolcarbamate | 1.4858 |
| n-propyl-N-allyl-N-$\beta$-cyanoethylthiolcarbamate | 1.5040 |
| n-propyl-N-methoxyethyl-N-$\beta$-cyanoethylthiolcarbamate | 1.4923 |
| n-propyl-N-methoxyethyl-N-cyanomethylthiolcarbamate | 1.4898 |
| n-propyl-N,N-bis-$\beta$-cyanoethylthiolcarbamate | 1.5088 |
| n-propyl-N-phenyl-N-$\beta$-cyanoethylthiolcarbamate | 1.5490 |
| n-propyl-N-hydroxyethyl-N-$\beta$-cyanoethylthiolcarbamate | 1.5109 |
| ethyl-N-methyl-N-$\beta$-cyanoethylthiolcarbamate | 1.5030 |
| ethyl-N-propyl-N-cyanomethylthiolcarbamate | 1.4937 |
| ethyl-N-isopropyl-N-$\beta$-cyanoethylthiolcarbamate | 1.4963 |
| ethyl-N-n-butyl-N-cyanomethylthiolcarbamate | 1.4908 |
| ethyl-N-n-butyl-N-$\beta$-cyanoethylthiolcarbamate | 1.4918 |
| ethyl-N-n-hexyl-N-$\beta$-cyanoethylthiolcarbamate | 1.4873 |
| ethyl-N-methoxyethyl-N-cyanomethylcarbamate | 1.4941 |
| ethyl-N-methoxyethyl-N-$\beta$-cyanoethylthiolcarbamate | 1.4955 |
| ethyl-N,N-bis-$\beta$-cyanoethylthiolcarbamate | 1.5127 |
| ethyl-N-cyclohexyl-N-cyanomethylthiolcarbamate | 1.5163 |
| ethyl-N-cyclohexyl-N-$\beta$-cyanoethylthiolcarbamate | 1.5165 |
| n-propyl-N-ethyl-N-(butyn(2)yl)thiolcarbamate b.p. (93 mm) | 91–92°C |
| n-propyl-N-propyl-N-$\beta$-cyanoethylthiolcarbamate | 1.4912 |
| n-propyl-N-$\beta$-chloroethyl-N-$\beta$-cyanoethylthiolcarbamate | 1.5131 |
| n-propyl-N-(-n-butyl)-N-(propargyl)thiolcarbamate b.p. (0.1 mm) | 82–83°C |

The agents for controlling plant growth according to the invention may be applied as solutions, emulsion, suspensions or dusts. The form of application depends entirely on the purpose for which the agents are being used; in any case it should ensure a fine distribution of the active ingredient.

For the preparation of solutions to be sprayed direct hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents such as ethylene oxide adducts. Concentrates which are suitable for dilution with water may be prepared from active ingredient, emulsifying or dispersing agent and possibly solvent.

Dusts may be prepared by mixing or grinding the active ingredients with a solid carrier such as clay, talc, diatomite or fertilizers.

The following examples illustrate the biological action of the new thiolcarbamates.

EXAMPLE 3

In a greenhouse, sandy soil is filled into pots and sown with seeds of beet (*Beta vulgaris*), wheat (*Triticum vulgare*), barley (*Hordeum vulgare*), rye (*Secale cereale*), oats (*Avena sativa*), annual meadow grass (*Poa annua*), perennial ryegrass (*Lolium perenne*) and slender foxtail (*Alopecurus myosuroides*). The soil prepared in this manner is then treated with 4 kg per hectare of n-propyl-N-propyl-N-β-cyanoethylthiolcarbamate (I) and, for comparison, with 4 kg per hectare of n-propyl-N-ethyl-N-n-butylthiolcarbamate (II), these amounts of the active ingredients each being emulsified in 500 liters of water per hectare. After six weeks it is ascertained that I has superior selectivity in cereals.

|  | Active Ingredient I | II |
|---|---|---|
| Crop plants: |  |  |
| Beet | 0 | 0 |
| Wheat | 10 | 30–40 |
| Barley | 10 | 30–40 |
| Rye | 0 | 30–40 |
| Oats | 20 | 50–60 |
| Unwanted plants: |  |  |
| Annual meadow grass | 100 | 100 |
| Perennial ryegrass | 100 | 100 |
| Slender foxtail | 100 | 100 |
| 0 = no action |  |  |
| 100 = total destruction |  |  |

EXAMPLE 4

In a greenhouse the plants wheat (*Triticum vulgare*), barley (*Mordeum vulgare*), rye (*Secale cereale*), oats (*Avena sativa*), garden cress (*Lepidium sativum*), mustard (*Sinapis alba*), wild mustard (*Sinapis arvensis*) and Russian vetch (*Vicia villosa*) are treated at a growth height of 5 to 10 cm with 4 kg per hectare of n-propyl-N-propyl-N-β-cyanoethylthiolcarbamate emulsified in 500 liters of water per hectare.

After three weeks the following results are ascertained:

| Wheat | 0–10 |
|---|---|
| Barley | 10 |
| Rye | 10–20 |
| Oats | 30 |
| Garden cress | 100 |
| Mustard | 50 |
| Wild mustard | 50–60 |
| Russian vetch | 100 |
| 0 = no action | 100 = total destruction |

EXAMPLE 5

An experimental area is sown with annual meadow grass (*Poa annua*), perennial ryegrass (*Lolium perenne*), slender foxtail (*Alopecurus myosuroides*), orchard grass (*Dactylis glomerata*), browntop (*Agrostis vulgaris*), wild mustard (*Sinapis arvensis*) and Russian vetch (*Vicia villosa*) and treated on the same day with 10 kg per hectare of n-propyl-N-propyl-N-β-cyanoethylthiolcarbamate emulsified in 500 liters of water per hectare. After three to four weeks almost all the plants are completely withered.

EXAMPLE 6

A plot with wild mustard (*Sinapis arvensis*), Russian vetch (*Vicia villosa*), annual meadow grass (*Poa annua*), perennial ryegrass (*Lolium perenne*) and slender foxtail (*Alopecurus myosuroides*) growing on it is sprayed, at a growth height of the plants of 3 to 8 cm, with 10 kg per hectare of n-propyl-N-propyl-N-β-cyanoethylthiolcarbamate dispersed in 500 liters of water per hectare. After two to three weeks almost all the plants are completely withered.

EXAMPLE 7

Loamy sandy soil is filled into pots and sown with seeds of Indian corn (*Zea mays*), beet (*Beta vulgaris*), cabbage (*Brassica oleracea var. vulgaris*), annual meadow grass (*Poa annua*), wild oats (*Avena fatua*), barnyard grass (*Echinochloa crus-galli*), green foxtail (*Setaria viridis*) and large crabgrass (*Digitaria sanguinalis*). The soil prepared in this manner is then treated with 3 kg per hectare of ethyl-N-propargyl-N-cyclohexylthiolcarbamate (I) and, for comparison, with 3 kg per hectare of ethyl-N-ethyl-N-cyclohexylthiol-carbamate (II), these amounts of the active ingredients each being dispersed in 500 liters of water per hectare. After four to five weeks it is ascertained that I has superior compatibility with Indian corn and cabbage.

|  | Active ingredient I | II |
|---|---|---|
| Crop plants: |  |  |
| Indian corn | 10 | 20–30 |
| Beet | 0–10 | 10 |
| Cabbage | 10 | 20–30 |
| Unwanted plants: |  |  |
| Annual meadow grass | 90 | 90 |
| Wild oats | 90–100 | 100 |
| Barnyard grass | 90–100 | 90 |
| Green foxtail | 90–100 | 90–100 |
| Large crabgrass | 80 | 70–80 |
| 0 = no action |  |  |
| 100 = total destruction |  |  |

EXAMPLE 8

A 2 m² plot with cabbage (*Brassica oleracea var. vulgaris*), beet (*Beta vulgaris*), annual meadow grass (*Poa annua*), wild oats (*Avena fatua*) and barnyard grass (*Echinochloa crus-galli*) growing on it is treated with 3 kg per hectare of ethyl-N-propargyl-N-cyclohexylthiolcarbamate (I) dispersed in 500 liters of water per hectare. After three to four weeks it is ascertained that the grassy weeds are almost completely withered whereas beet and cabbage undergo only slight growth retardation which is overcome later on.

The compounds listed after Example 2 have the same good biological action as I in Examples 3 to 8.

We claim:

1. Ethyl-N-cyclohexyl-N-propargylthiolcarbamate.

* * * * *

PO-1050.
(5/69)

UNITED STATES PATENT OFFICE
CERTIFICATE OF CORRECTION

Patent No. 3,687,997        Dated August 29, 1972

Inventor(s) Karl Kiehs, Karl-Heinz Koenig, and Adolf Fischer

It is certified that error appears in the above-identified patent and that said Letters Patent are hereby corrected as shown below:

First page, left-hand column, tenth line, insert
-- [73] Assignee: Badische Anilin- & Soda-Fabrik Aktiengesellschaft, Ludwigshafen Rhein, Germany --;

line thirteen, insert
-- [30]      Foreign Application Priority Data
April 26, 1968     Germany . . . . P 17 68 296.1 --.

Column 2, line 2, "water oil" should read -- water-clear oil --.

Column 3, line 38, "(Mordeum vulgare)" should read -- (Hordeum vulgare) --.

Signed and sealed this 15th day of January 1974.

(SEAL)
Attest:

EDWARD M. FLETCHER, JR.
Attesting Officer

RENE D. TEGTMEYER
Acting Commissioner of Patents